(12) United States Patent
DeCusatis et al.

(10) Patent No.: US 7,616,889 B2
(45) Date of Patent: *Nov. 10, 2009

(54) BYTE-WIDE OPTICAL BACKPLANE SWITCHING METHOD

(75) Inventors: Casimer M. DeCusatis, Poughkeepsie, NY (US); Lawrence Jacobowitz, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/851,509

(22) Filed: Sep. 7, 2007

(65) Prior Publication Data

US 2007/0297798 A1 Dec. 27, 2007

Related U.S. Application Data

(63) Continuation of application No. 10/697,829, filed on Oct. 30, 2003, now Pat. No. 7,336,900.

(51) Int. Cl.
  *H04J 14/00* (2006.01)
(52) U.S. Cl. .............................. 398/45; 398/51; 385/17; 385/18
(58) Field of Classification Search ............. 398/45, 398/51, 53; 385/17, 18, 16
  See application file for complete search history.

(56) References Cited

U.S. PATENT DOCUMENTS

| | | | |
|---|---|---|---|
| 5,333,225 A | 7/1994 | Jacobowitz et al. |
| 5,337,388 A | 8/1994 | Jacobowitz et al. |
| 5,396,573 A | 3/1995 | Ecker et al. |
| 5,522,088 A | 5/1996 | Halma et al. |
| 5,581,566 A | 12/1996 | St. John et al. |
| 5,651,033 A | 7/1997 | Gregg et al. |
| 5,761,350 A | 6/1998 | Koh |
| 5,787,094 A | 7/1998 | Cecchi et al. |
| 5,842,881 A | 12/1998 | Ecker et al. |

(Continued)

OTHER PUBLICATIONS

Allan Roger, "MEMS Technology Propels Telecom Systems Toward an All-Optical Network", Electronic Design, Apr. 16, 2001, 8 pages., http://www.elecdesign.com/Articles/Print.cfm?ArticleID=4050.

(Continued)

*Primary Examiner*—M. R. Sedighian
(74) *Attorney, Agent, or Firm*—Arthur Ortega, Esq.; Kevin P. Radigan, Esq.; Heslin Rothenberg Farley & Mesiti PC

(57) ABSTRACT

A byte-wide optical switch and switching method are provided. The optical switch includes a first set of ports for receiving in parallel an optical byte of data, and multiple second sets of ports each capable of outputting in parallel the optical byte of data. An array of optical switching elements is disposed between the first set of ports and the multiple second sets of ports. The array of optical switching elements direct the optical byte of data in parallel from the first set of ports to at least one second set of ports of the multiple second sets of ports. The switching elements may comprise micro-electro mechanical system (MEMS) devices, each having a position controllable reflective surface. Thin film optical filters can be provided on the reflective surfaces for wavelength selective switching.

3 Claims, 7 Drawing Sheets

U.S. PATENT DOCUMENTS

| | | | |
|---|---|---|---|
| 5,867,648 | A | 2/1999 | Foth et al. |
| 5,920,664 | A | 7/1999 | Hirabayashi et al. |
| 6,356,679 | B1 * | 3/2002 | Kapany .................. 385/18 |
| 6,614,954 | B2 | 9/2003 | Huang et al. |
| 6,836,353 | B1 | 12/2004 | Ramadas et al. |
| 6,912,336 | B2 | 6/2005 | Ishii et al. |
| 6,925,218 | B2 | 8/2005 | Burroughs |
| 7,336,900 | B2 * | 2/2008 | DeCusatis et al. ............ 398/45 |
| 2003/0185493 | A1 | 10/2003 | Akashi et al. |

OTHER PUBLICATIONS

Bell Labs, Lucent Technologies, "Micro-Mirrors and Free-Space Optics Used to Route Optical Signals", Feb. 16, 1998, 2 pages, http://www.bell-labs.com/news/1998/February/16/1.html.

Hart et al., "MEMS Enhance Optical Switching", Planet Analog, Jul. 17, 2000, 5 pages, http://www.planetanalog.com/story/OEG20000717S0039.

Mlynek et al., "Intelligent Cross-Bar Switch for Optical Telecommunications based on Micro-Mirror Array", Worcester Polytechnic Institute, 8 pages, http://www.ece.wpi.edu./~-leblebic/switch/.

* cited by examiner

BYTE-WIDE OPTICAL BACKPLANE SWITCHING METHOD

CROSS-REFERENCE TO RELATED APPLICATIONS

This application is a continuation of co-pending U.S. patent application Ser. No. 10/697,829, filed Oct. 30, 2003, and published May 5, 2005 as U.S. Patent Publication No. US/2005-0095000 A1, entitled "Byte-Wide Optical Backplane Switch and Switching Method", by DeCusatis et al. This application is also related to co-pending U.S. patent application Ser. No. 11/843,127, filed Aug. 22, 2007, entitled "Byte-Wide Optical Backplane Switching Method", by DeCusatis et al. Additionally, this application is related to U.S. patent application Ser. No. 11/851,503, co-filed herewith, entitled, "Byte-Wide Optical Backplane Switch", by DeCusatis et al. The entirety of each of the above-noted applications is hereby incorporated herein by reference.

TECHNICAL FIELD

The present invention relates generally to optical data transfer, and more particularly, to an optical switch for a computing subsystem which receives and switches in parallel an optical byte of data from at least one first set of ports to at least one second set of ports.

BACKGROUND OF THE INVENTION

The S/390 Computing System offered by International Business Machines Corporation currently uses a 12 channel data bus known as a self-timed interface (STI) for many applications within the system architecture. For example, STI is typically used as a connector between a memory bus adapter and an input/output (I/O) subsystem. Radiated electromagnetic noise from copper STI interfaces and external noise coupled into the interfaces from other components in the system pose significant design challenges. As data rates increase and bus lines become longer, these problems become more significant making it difficult to maintain system integrity along the bus. For example, current STI links are limited to about 20 meters distance.

Prior United States Letters Patents discussing STI data buses have principally been directed to copper interconnections. For example, reference U.S. Pat. Nos. 5,522,088; 5,651,033; 5,867,648; 5,787,094, and 5,581,566, each of which is hereby incorporated herein by reference in its entirety.

As computer systems become larger and more complex, the amount of data which can be conveyed over an electrical backplane or over copper wire interconnections between processor chips, via for example a memory bus adapter and I/O subsystem, becomes a bottleneck to improved performance.

SUMMARY OF THE INVENTION

Fiber optic communication systems offer significantly enhanced bandwidth compared with copper interconnections, so they are a viable approach for interchip, intercard, and system backplane interconnections.

Therefore, provided herein in one aspect is of an optical switch interconnection which includes at least one first set of ports and multiple second sets of ports. The at least one first set of ports receives in parallel an optical byte of data, and each second set of ports is capable of outputting the optical byte of data in parallel. The optical switch also includes an array of optical switching elements disposed between the at least one first set of ports and the multiple sets of second ports, wherein the array of optical switching elements directs the optical byte of data in parallel from the at least one first set of ports to at least one second set of ports of the multiple second set of ports.

In a further aspect, a computing system is provided which includes at least one computing subsystem having at least one processing unit and at least one bus adapter through which the at least one processing unit communicates with at least one input/output (I/O) subsystem. The computing system further includes at least one optical switch optically coupled between the at least one bus adapter and the at least one I/O subsystem. The at least one optical switch transfers in parallel an optical byte of data received at a first set of ports to at least one second set of ports, the at least one second set of ports being selected from multiple second sets of ports of the at least one optical switch.

In another aspect, a device is provided which includes a substrate having multiple layers disposed thereon. The multiple layers include a first optical waveguide layer having at least one first set of ports for receiving in parallel an optical byte of data, and a second optical waveguide layer having multiple second sets of ports capable of outputting in parallel the optical byte of data. The multiple layers further include an optical switching element layer for facilitating directing of the optical byte of data in parallel from the at least one first set of ports of the first optical waveguide layer to at least one second set of ports of the multiple second sets of ports of the second optical waveguide layer.

In a still further aspect, an optical switching method is provided herein which includes: receiving in parallel an optical byte of data at a first set of ports of an optical switch; and employing an array of optical switching elements within the optical switch for transferring the optical byte of data in parallel from the first set of ports to a second set of ports of the optical switch.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In U.S. Pat. Nos. 5,333,225, 5,337,388, 5,396,573, and 5,842,881, each of which is hereby incorporated herein by reference in its entirety, interfacing of optical fiber to various types of multichip module packages and multi-layer printed circuit boards is described. Objects of these patents include addressing packaging and mechanical problems involved in combining optical fiber with conventional chip packaging, and bonding techniques. As the applications for optics in the backplane become more mature, there is identified herein a need for optical backplane switching and routing of backplane interconnects. It is not sufficient to simply provide fiber optic I/O to a chip carrier, rather the optical signals must be switched from one location to another, in a manner that provides low latency, high speed, and low jitter and skew, across multiple bit intervals. To achieve low latency and hence better system performance, it is desirable to eliminate the need for serial-to-parallel conversions of data, as well as minimize optical-to-electrical data conversion. Furthermore, parallel interconnections with each line running at 2.5 Gbit/s provide an economical path to reaching 10 Gbit/s bandwidths, without requiring more expensive high speed electronics and also avoiding the technical problems inherent in high speed serial links, such as radiated noise, EMC, high signal loss over relatively short distances, etc.

Provided herein in one aspect therefore, is an all-optical switch fabric for parallel (byte-wide) data buses, which can be implemented as an integral part of a multi-chip module or printed circuit card.

Figure 1:
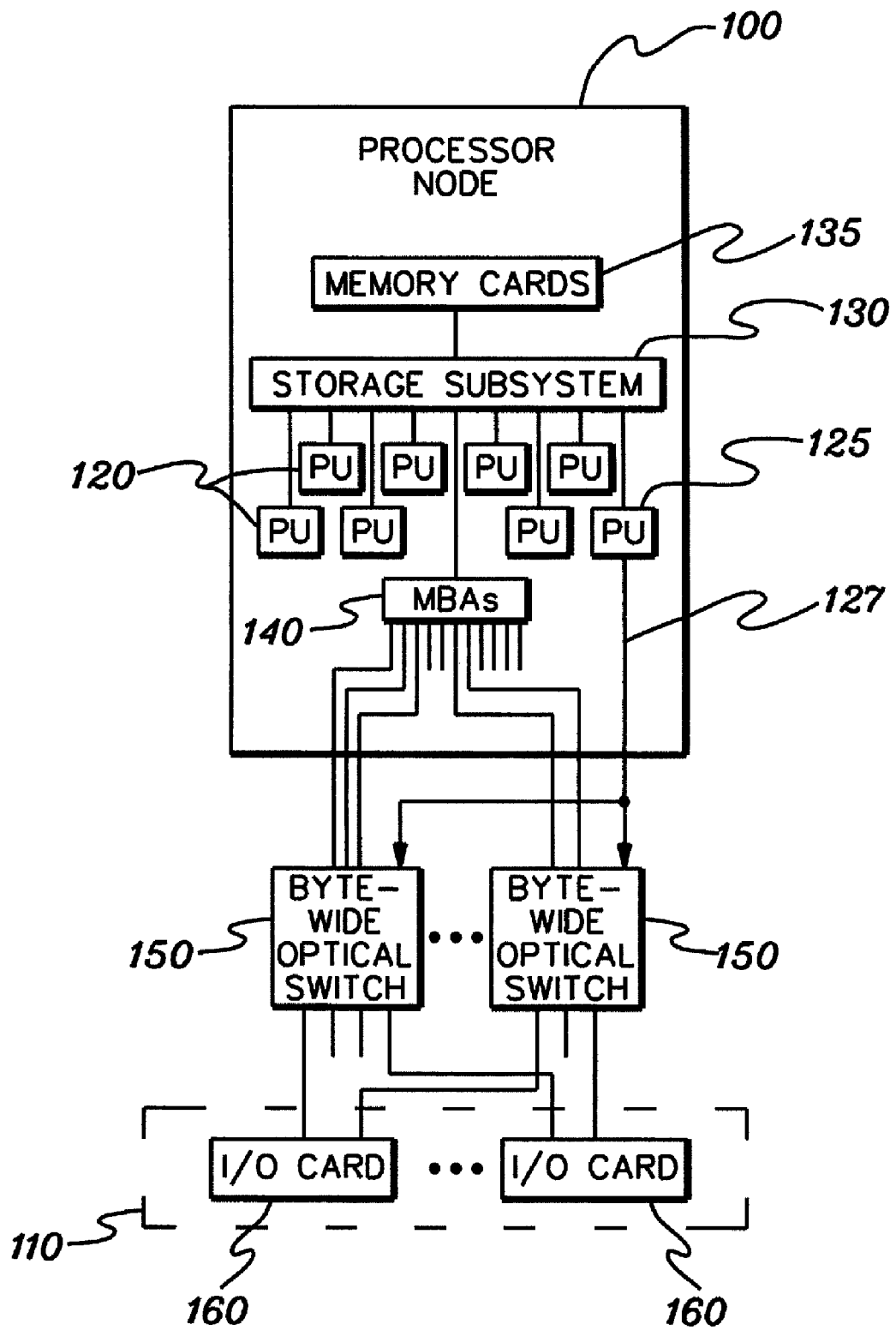
FIG. 1 is a block diagram of one embodiment of a processor node employing multiple byte-wide optical switches, in accordance with an aspect of the present invention.

FIG. 1 depicts one application of an optical switch, in accordance with an aspect of the present invention. In this figure, a computer system is shown as including a processor node or computing subsystem 100, an input/output (I/O) system 110, and multiple byte-wide optical switches 150. Within computing system 100, multiple processing units "PU" 120 access a storage subsystem 130 and memory cards 135, as well as one or more memory bus adapters "MBAs" 140. Conventionally, self-timed interface (STI) links might couple MBAs 140 with I/O system 110. Today, each STI link is a parallel copper interconnect running at either 0.5 Mbyte or 1 Mbyte between processor memory bus adapter 140 and the I/O system. The STI links support, for example, ESCON, FICON, Fibre Channel, or other open system protocols. These links are typically limited to three to five meters in length in copper, but advantageously, can extend up to hundreds of meters in optical fiber. Longer distances than three to five meters are rapidly becoming a requirement for future systems, since the number of server nodes which can be clustered together is limited by the link distance and bandwidth available. Conventionally, the STI links are point-to-point bus connections only.

As shown in FIG. 1, and in accordance with an aspect of the present invention, byte-wide optical switches can be employed to optically interconnect the bus adapters with the I/O system. This switched bus interconnect has a potential performance advantage since the processor to memory interconnect typically runs two to four times faster than the other system bus(es), making this a good candidate application for optical switched STI links. In one example, the STI optical links of FIG. 1 could transfer data at 1 to 3 Gbyte/s between the bus adapters and the optical switches, while the links between the optical switches and the I/O cards 160 of I/O system 110 may each have a bandwidth of 0.5 to 1.0 Gbyte/s. A ribbon of optical fiber can be employed as interconnect between the bus adapters and the optical switches. Each line shown in FIG. 1 is intended to represent, by way of example, a byte-wide optical link. (As used herein, "byte-wide" refers to a byte of optical data, with the bits thereof being transferred in parallel. A byte may comprise two or more bits.) These optical links, as well as the optical links between the optical switches and the I/O cards are preferably bidirectional.

As shown, each optical switch 150 can connect to any one or all of the I/O cards 160 (also referred to herein as I/O subsystems). As an operational example, processor node 100 may comprise a central electronic complex (CEC), with electrical signals being converted at the memory bus adapter, to optical signals using optical transceivers. Similarly, the I/O cards 160 could include optical transceivers for converting from the optical signals received via the byte-wide optical switches into electrical signals. A control signal bus 127 connects control logic 125, which in this example comprises one of the processing units 120, with each of the byte-wide optical switches 150. Data is switched in parallel, but the destination address is not embedded in the data. This helps to maintain a low latency. Instead, the control logic in processor unit 125 decides where the data should go, and configures the byte-wide switch(es) accordingly. As one example, this logic could be readily implemented by one skilled in the art in software. Also, the control lines can potentially run at slower speeds than the data bus, since it may be possible to switch multiple bytes of data with a single switch configuration.

Figure 2:
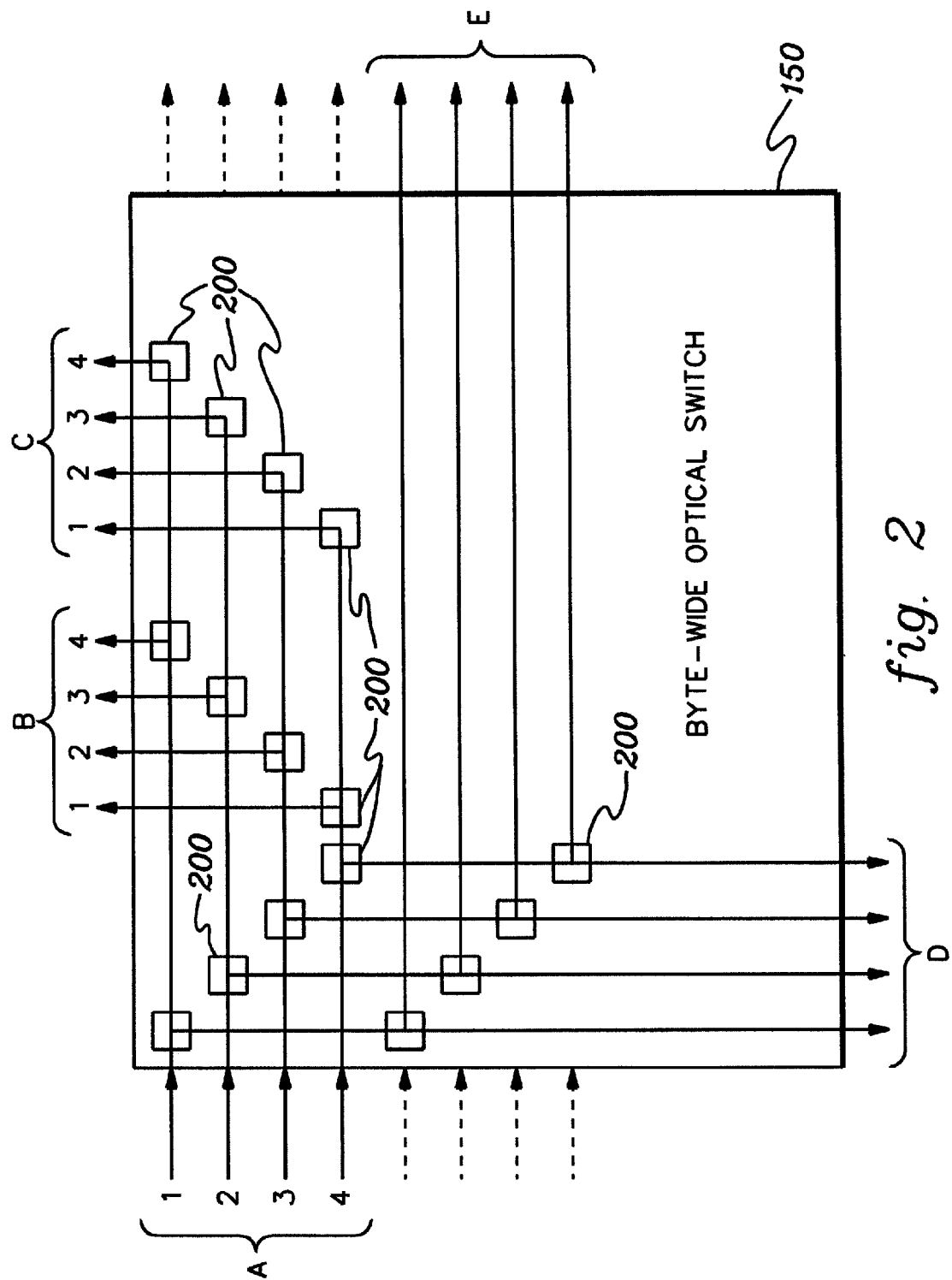
FIG. 2 is a block diagram of one embodiment of a byte-wide optical switch, in accordance with an aspect of the present invention.

FIG. 2 depicts one example of a byte-wide optical switch useful in a computer system such as depicted in FIG. 1. This byte-wide optical switch 150 may be implemented at one or more multi-chip package layers with several parallel optical bus interconnections. These connections can be provided by ribbons of optical fiber, and may carry a number of different protocols, such as the STI bus protocol used by the IBM S/390 and RS/6000 computer systems, the RIO bus used by an IBM AS/400 computer system, or any other types of SCSI or SCI bus attachments. Alternatively, the connections may represent an Infiniband parallel bus. Advantageously, the byte-wide optical switch provides a non-blocking switch capable of routing in parallel the bits of an optical byte of data from an input set of ports to any one of the available output set of ports.

As one example, the optical switching elements 200 within the byte-wide optical switch could comprise micro-electro mechanical system (MEMS) switch elements. Alternatively, the switch elements may be achieved by other means such as liquid crystals, electro-optic devices, etc. As illustrated in FIG. 2, optical switching elements 200 of byte-wide optical switches 150 are arranged such that each bit of the optical byte of data travels a different distance within byte-wide optical switch 150 before impinging on a respective optical switching element and travels a common distance within byte-wide optical switch 150, and thus experiences a common latency through the byte-wide optical switch from a first set of ports to a second set of ports thereof.

Figure 3:
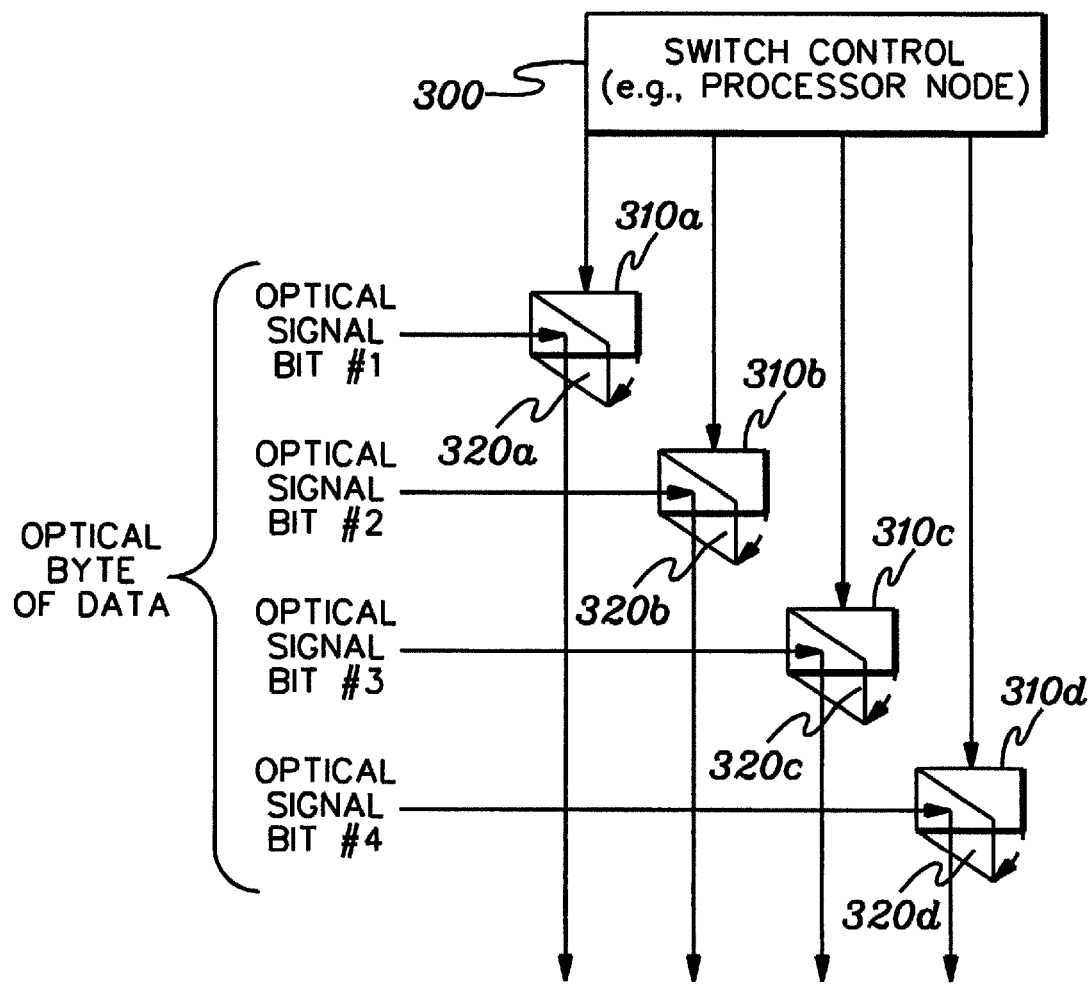
FIG. 3 is a partial schematic of a subset of switching elements of a byte-wide optical switch, in accordance with the present invention.

FIG. 3 depicts one example of a subset of optical elements 310a, 310b, 310c & 310d which are operated in parallel to switch the bits of an optical byte of data. In this example, the optical byte of data is assumed to comprise a four-bit signal. Alternatively, the optical byte of data may comprise any two or more grouping of optical data bits, such as an 8-bit byte or a 10-bit byte. The 4-bit byte examples disclosed in FIGS. 2 & 3 are shown by way of example only.

MEMS are microscopic mechanical elements which can move between two positions, either passing or blocking light from an optical fiber. Switching of the MEMS devices is controlled by control logic, such as switch control 300 in FIG. 3. This switch control 300 could reside within a process unit 125 (FIG. 1) as described above. Operation of individual MEMS devices between an extended and retracted position is well known to those skilled in the art. Each MEMS device includes a mirrored surface 320a, 320b, 320c & 320d for reflecting a corresponding optical bit of data when extended (that is, in the example shown in FIG. 3). If the MEMS devices are not extended, then the corresponding optical signal bits might pass directly across the respective MEMS devices 310a, 310b, 310c & 310d. In this example, electrical signals from switch control 300 are assumed to control the MEMS devices, while the data itself comprises optical signals that are being routed by the byte-wide optical switch.

Note that a MEMS device is basically a small mirror on a pivot, which is moved either into or out of the light path by applying a voltage. This voltage comes from the switch controller, which can be embedded in one or more of the processing units. The switch controller switches a byte of data in parallel, and accomplishes this by configuring at least one MEMS device for each bit in the byte. Thus, FIG. 3 depicts a parallel control bus. Operationally, in one example, the switch controller may be told that the optical byte of data on ports A (in FIG. 2) is to be routed to ports B. The controller then determines which MEMS devices need to be switched, and drives these devices with a parallel control signal into the desired state. Once the byte-wide switch is configured, the control logic releases the data from memory to flow through the switch to the desired I/O subsystem(s). Multiple rows of parallel MEMS devices may need to be switched, as in the example of FIG. 2 when the byte of optical data at ports A is to be switched to ports E, for example, via two layers of MEMS devices.

As a further enhancement, the mirrored surfaces of the MEMS devices can be coated with thin film optical filters which allow the MEMS devices to switch light of only a specific wavelength. This wavelength dependent switching can be employed in various implementations. For example, referring to FIG. 2, all optical data bits 1, 2, 3 & 4 of a byte at ports A may be of the same wavelength. If this common wavelength is a first wavelength, then the optical switch could route the received optical byte of data to one set of ports B, and if of a second wavelength, then the switch may route the optical byte of data from ports A to a second set of ports C.

In an alternative implementation, some or all of the optical data bits of the optical byte of data received at ports A may be of different wavelengths, but they may still be switched in parallel. Further, different thin film optical filters could be employed on the mirrors of the MEMS devices to choose to send the bits to ports B or ports C, for example.

Referring to FIG. 2, and by way of further example, an optical byte of data may be received at a first set of ports A via multiple data lines all carrying modulated data at a specific wavelength, lambda 1. This optical byte of data can be switched to, for example, two parallel sets of ports B and/or ports C depending upon whether the MEMS devices at these locations are active. Furthermore, the data links into the first set of ports A may be carrying additional data at a separate wavelength, lambda 2. If the first MEMS devices include filters which reflect lambda 2 and lambda 1, then both data paths are switched together. If these MEMS devices include a filter which reflects only lambda 1, then the two data busses are separated and the data carried at lambda 2 may pass along to another subset of switching elements. Note that since wavelength tunable laser arrays are under development, it may be possible to change the operating lambda of the optical byte of data at the first set of ports A, thus determining which MEMS devices would be allowed to switch the particular channel. By incorporating multiple switching elements with different wavelength filters, many combinations are possible, and the switch can be scaled to handle thousands of parallel optical buses in a very small area. The optical fiber diameter and the size of a MEMS device might both be between 10 and 50 microns, so multiple switch layers can be incorporated into a very small space. FIG. 2 also shows examples of switching between a first set of ports A and a second set of ports D or a first set of ports A and a second set of ports E. Thin film optical waveguides may be fabricated in a plane on the surface, and photolithographically pattern to form the desired interconnection between the MEMS devices in FIG. 2. Although MEMS devices currently available offer switching speeds of up to tens of MHz, the present invention can achieve greater effective throughput by switching an entire byte at one time.

Figure 4:
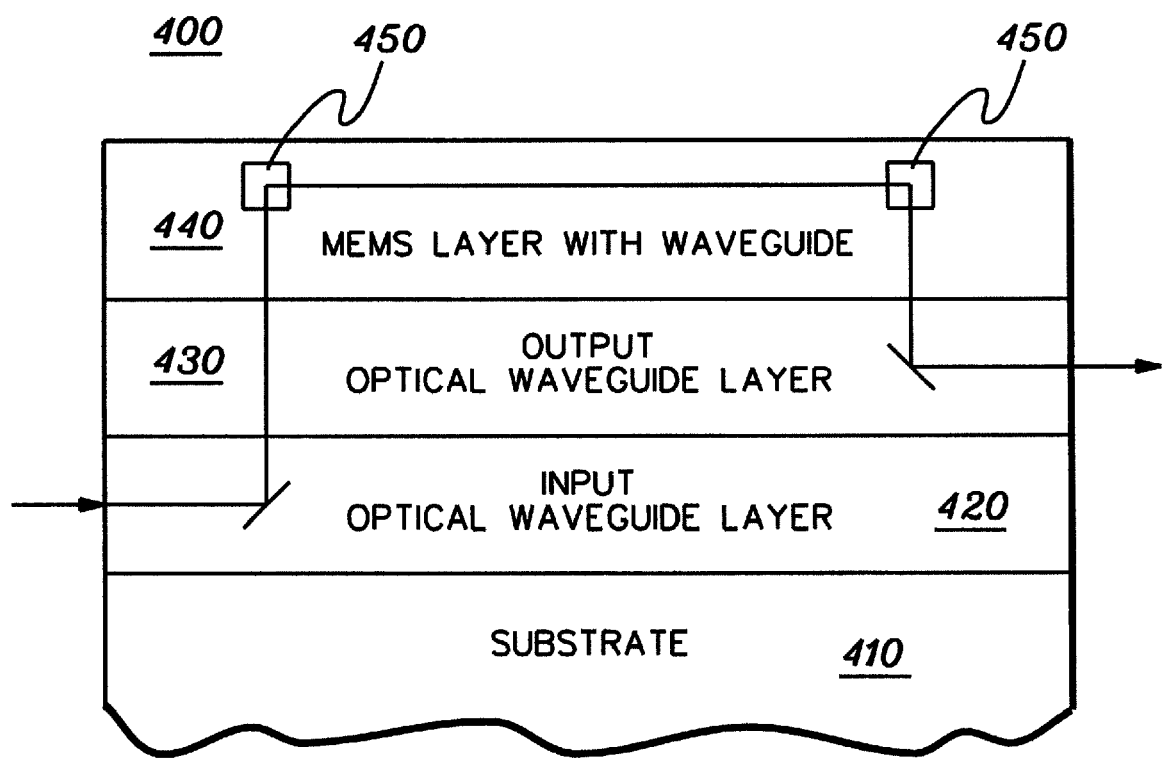
FIG. 4 is a cross-sectional elevational view of one embodiment of a multi-layered optical switch device, in accordance with an aspect of the present invention.

As shown in FIG. 4, byte-wide optical wavelength switching using MEMS devices can also be achieved in multi-layer packages, such as glass ceramic and thick laminate PC boards. FIG. 4 depicts one example of such a package. In this example, a substrate 410 comprises a glass ceramic, silicon, or other material, and has on its underside an electrical control interface (not shown) for the MEMS devices. This electrical interface and wiring through the multichip module (MCM) is not shown for purposes of clarity. As one example, pins (not shown) could be disposed on the bottom of the substrate, which would couple to a large connector and power up the MCM electrically. Similarly, the optical interface or coupling into and out of the MCM is not shown. This interface would comprise a peripheral interconnect structure used to couple light from the optical links into and out of the multichip module. By way of example, reference the above-incorporated U.S. Letters Patents.

Above substrate 410 is a first optical waveguide layer 420, labeled "input optical waveguide layer". In this example, layer 420 receives as input a byte of optical data. This byte of optical data is directed through an optical via to a switching layer 440, which is labeled "MEMS layer with waveguide". The optical vias could be fabricated as cleaved end faces of an optical fiber. From the switching layer, MEMS devices 450 are employed to direct the byte of optical data to an appropriate set of output ports, which in this example are located in a second optical waveguide layer 430, labeled the "output optical waveguide layer". Various three dimensional structures are possible using the approach of FIG. 4, with the switching function segregated into a single plane, or combined with one or more of the input and output waveguide layers. Other planes may contain integrated circuits for controlling the MEMS devices, or for processing electrical data, or other functions. Note that this approach is compatible with existing batch manufacturing processes, and that other optical processing elements such as amplifiers, attenuators, or filters may be incorporated into the signal path, as desired.

Figure 5:
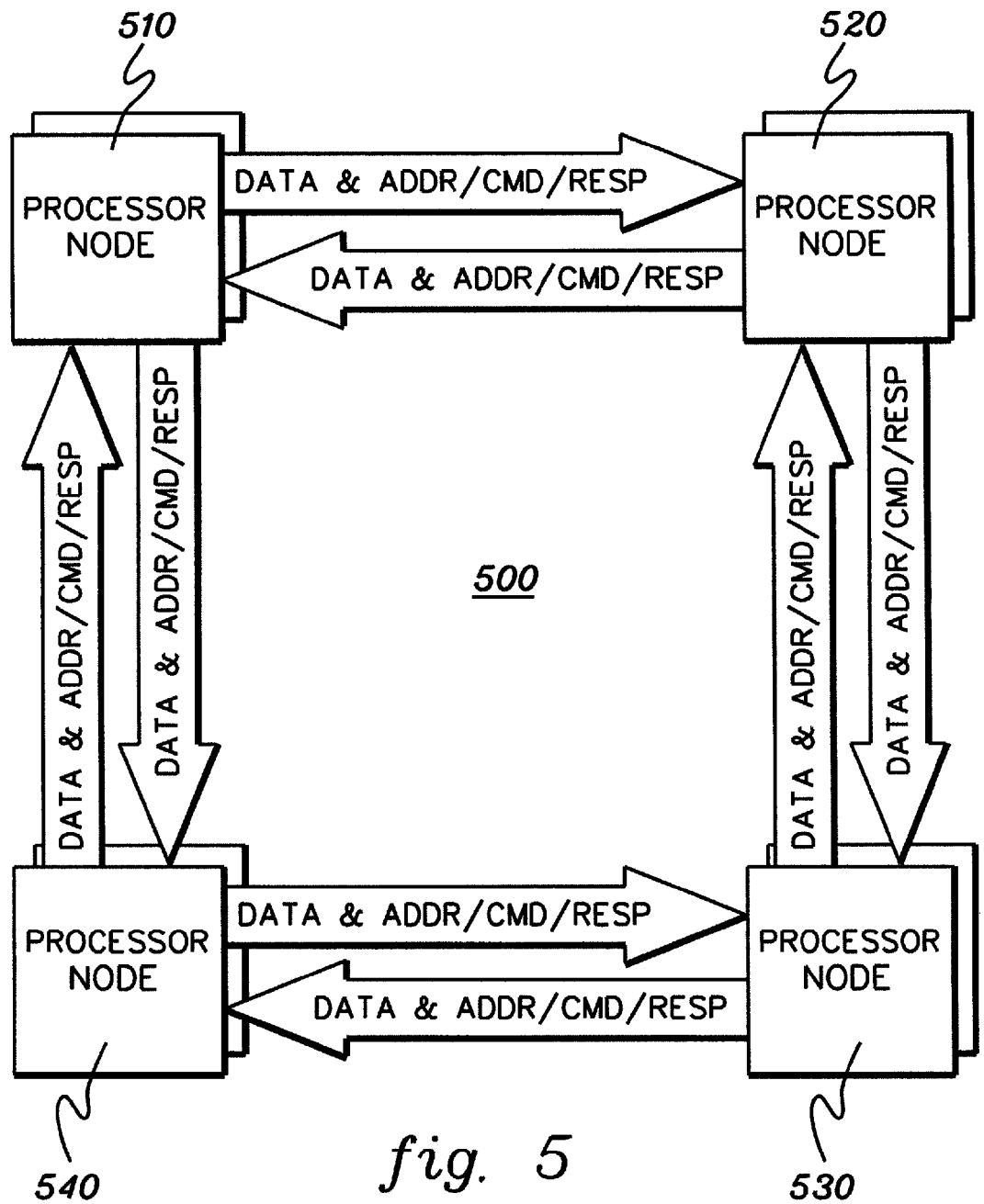
FIG. 5 is a block diagram of one embodiment of an approach for interconnecting multiple processor nodes.

FIG. 5 depicts one example of a current ring architecture 500 for interconnecting processing nodes 510, 520, 530, 540 of a computer system. The interconnections between nodes are currently copper interconnects which are static and limited to short distances. Latency is incurred when communicating around the ring of FIG. 5, and is sufficient to reduce the total system performance. In one practical implementation, the interconnection approach of FIG. 5 includes two concentric rings, which are point-to-point connects only between processor nodes. In one ring, data and addresses/commands/responses flow in one direction, while in the other ring data and addresses/commands/responses flow in the opposite direction. These rings are unidirectional buses running at, for example, 2:1 or 3:1, with elastic interfaces. Other characteristics of existing buses include a bandwidth of 16 B of data, 4 B of multiplexed ADDR, CMD, RESP, tags per directional link, multiple nest cycle bus latency, same bus latency within directional links, and a lack of flexibility with the static design. Because of the ring traffic, a request may be launched on both rings and make a complete loop. Each request is stalled inside a processor node as the request is being processed. This can result in requests on the ring running ahead of one another.

Figure 6:
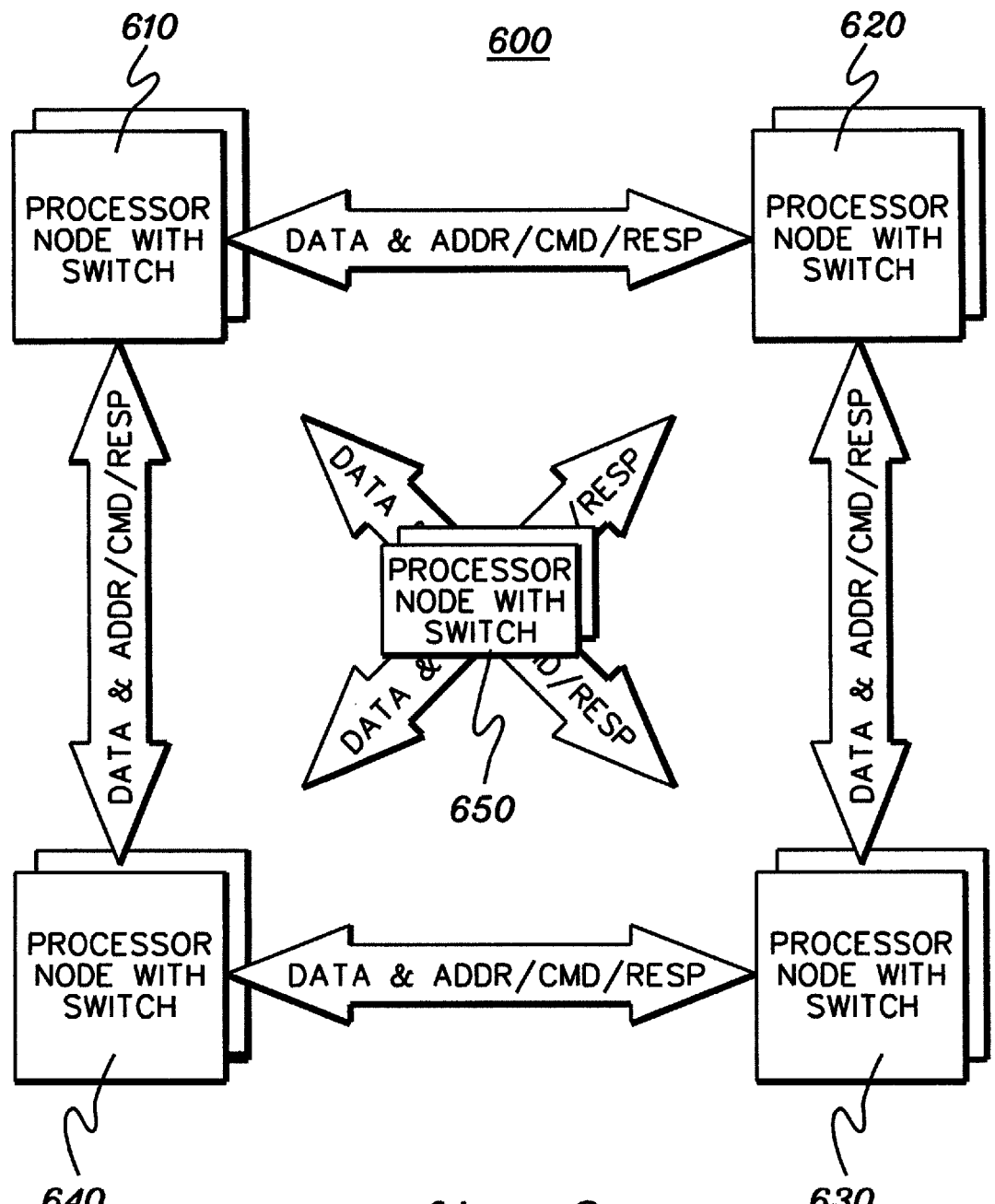
FIG. 6 is a schematic of one embodiment of an approach for interconnecting multiple processor nodes employing byte-wide optical switches, in accordance with an aspect of the present invention.

FIG. 6 shows an extension of the architecture of FIG. 5, which is possible using the byte-wide optical switching of the present invention. In this architecture example 600, fiber optic interconnection is assumed between the processor nodes 610, 620, 630, 640 & 650. Each processor node, for example, the processor node of FIG. 1, includes at least one byte-wide optical switch deployed in a switch fabric between the multiple processing units or servers of the node and the I/O subsystems. As a specific example of this interconnection, the interconnection size may be 2×200×3 links (or approximately 1200 lines), with multiple switches being used. Further, multiplexed wavelengths may be employed to provide this capacity. The bus structures could comprise a unidirectional bus running at 1:1 with elastic interfaces. The bandwidth could comprise 16 B data, 4 B multiplexed ADDR, CMD, RESP, tag per directional link, with direct link bus latency, and same bus latency from node to node of a few nanoseconds. Operationally, requests are directed to the particular node directly, there is no request interaction, and also no bus contention, thus providing better performance. Further, each processing node is cache coherent so that if one node goes down, the remaining nodes survive. This may not be the case with the ring configuration architecture of FIG. 5.

Figure 7:
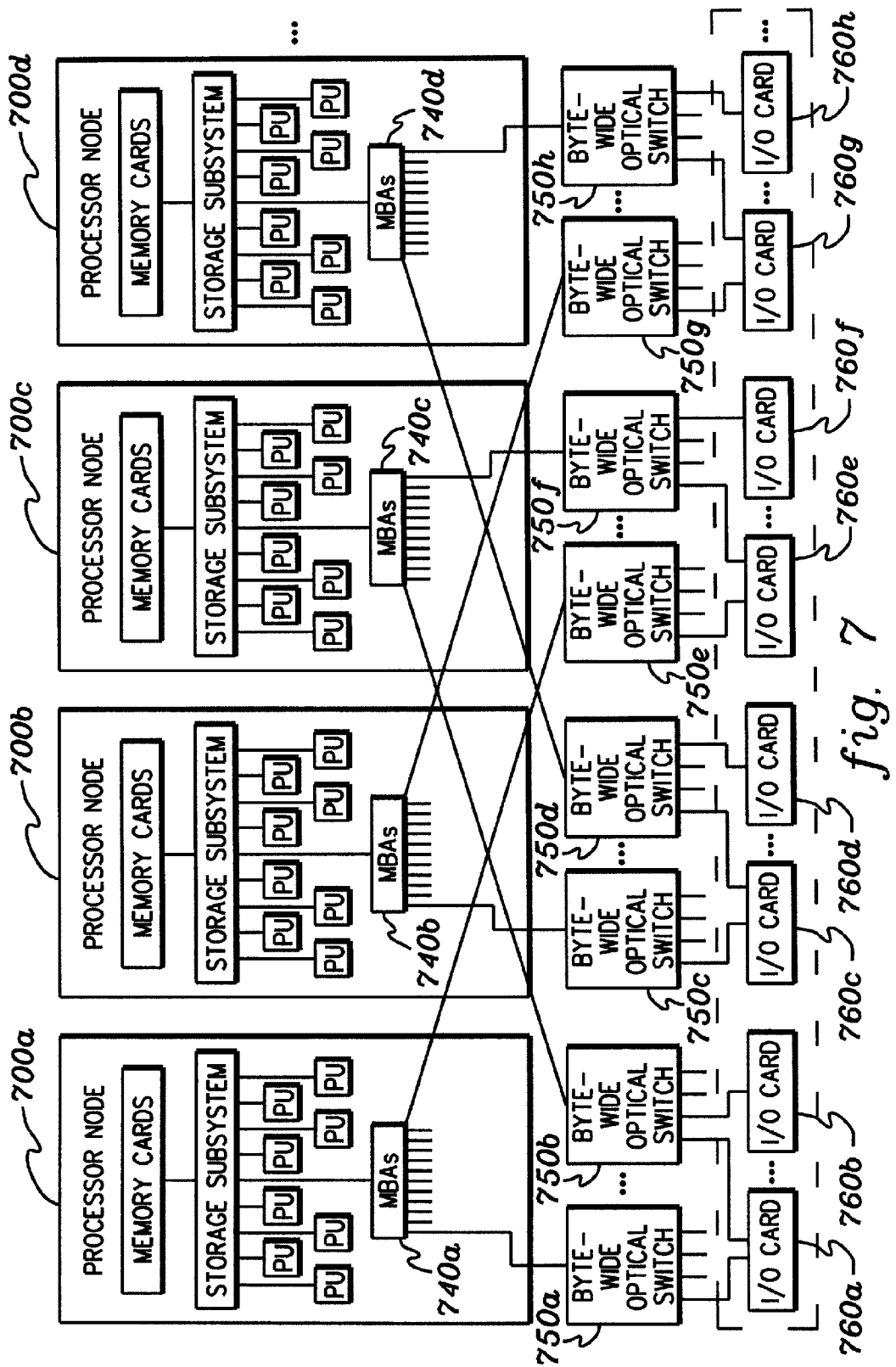
FIG. 7 is a block diagram of one embodiment of a computer system having multiple processor nodes interconnected using byte-wide optical switches, in accordance with an aspect of the present invention.

FIG. 7 depicts one example of a computer electronic complex (CEC) system having multiple processor nodes, or computing subsystems, such as depicted in FIG. 1. In this computer system, an interconnect scheme is depicted using parallel optical STI links and the byte-wide optical switches (with wavelength multiplex links) as described hereinabove. By way of example, each processor node 700a, 700b, 700c & 700d connects via bus adapters 740a, 740b, 740c & 740d, to one or more of the multiple byte-wide optical switches 750a, 750b, 750c, 750d, 750e, 750f, 750g & 750h, which are shown by way of example. The data links connecting the bus adapters and the byte-wide optical switches are assumed to comprise parallel optical links, each of which passes an optical byte of data. Further, the byte-wide optical switches are shown to have data links connected to one or more of the I/O subsystems or I/O cards 760a, 760b, 760c, 760d, 760e, 760f, 760g & 760h, which again are shown by way of example.

To summarize, disclosed herein is a byte-wide optical switch which employs MEMS devices for switching an optical byte of data in parallel, rather than serially. In one embodiment, the byte-wide switching takes place in a single plane, and is thus compatible with existing multichip packages. Further, optical fibers do not cross over each other in a fiber ribbon cable, and the parallel optical beams are maintained with low jitter and low skew across the parallel array. Disclosed herein is a switch topology which achieves these characteristics.

In another aspect, disclosed herein is the concept of combining wavelength multiplexing thin film filters with MEMS switch technology. This allows an optical switch to be protocol independent. Thus, there is no need to determine which protocol is being carried on a given data bus, since the optical switch device merely switches wavelengths. By taking advantage of wavelength multiplexing, the bandwidth of an optical backplane can be significantly increased. Depending on the system needs, either course WDM (only a few wavelengths) or dense WDM (many wavelengths spaced closely together) may be used. The switch may be controlled by an out-band signal, derived either from other electronic chips in the package or by sampling and decoding one of the channels on the optical bus.

In another aspect, disclosed is the concept of providing an optical switch layer as an integral part of a multichip package for optical backplanes. The applications for optical backplanes will begin to emerge as processor speeds increase to 1 GHz and beyond, while performance grows into the multi-BIP and tera-flop regions. Industry standards based on parallel bus technology for next generation I/O, such as Infiniband, have recently been released. Both of these are driving increased interest in switchable optical backplanes. Another driving factor is the emergence of fiber to the home environment, to serve applications such as interactive video and video-on-demand. This application will require large servers at the transmission point, with high bandwidth interconnections to facilitate real-time transaction processing.

In the above examples, a four channel parallel bus is shown by way of example only to illustrate possible switching configurations. Likewise, the example of FIG. 4 shows how different MCM layers could be interconnected using this approach, but other designs can also be accommodated. Note that the same number of MEMS devices may be present in the optical path for different switch configurations, for example, for a switch from ports A to ports B or from ports A to ports E in FIG. 2. The MEMS devices are controlled and powered through electrical interconnections or vias within the MCM layers, and the MEMS element switching may be coordinated through other circuit elements within the MCM. The interconnect can then be dynamically reconfigured through external electrical control. Various sizes of MCM substrates can be accommodated, depending upon the number of switch elements and ports required. The fibers can be either pigtailed into the MCM waveguide substrate, or connected using industry standard parallel optical connectors.

Advantageously, disclosed herein is a byte-wide optical switch which allows switching of a parallel data bus, without either serializing the data stream or converting it to electronic form. Because the switch can be made protocol independent, it has applications to many different systems. The byte-wide optical switch may also include wavelength multiplexing as a means to increase switch bandwidth. Advantageously, the concepts disclosed herein contribute to low latency data buses in large clustered servers and overcome a bandwidth bottleneck inherent in today's clustered processor architecture. The byte-wide optical switch allows for low jitter and low skew switching on a parallel optical bus. The approach also combines wavelength multiplexing (protocol independent switch technology) with optical MEMS switching. It enables optical add/drop of channels without optical to electrical conversion or serial to parallel conversion, which reduces latency and improves system performance. The concepts disclosed herein provide a high performance MCM package for switched parallel optical interconnects, which is a high efficiency, low cost solution. The MCM package may include an optical switching layer, with partially reflective mirrors to form optical vias vertically through the substrate. This can be realized by various means, including creating a hole in the MCM and filling it with polymer or other material. The ability to place MCM devices on a single plane and interconnect multiple optical planes using this approach makes for a very flexible switch element design, and acts as a building block for larger systems.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A switching method comprising:

receiving in parallel an optical byte of data at a first set of ports of an optical switch; and employing an array of optical switching elements within the optical switch for transferring the optical byte of data in parallel as a unit from the first set of ports to a second set of ports of the optical switch, wherein each bit of the optical byte of data travels a different distance within the array of optical switching elements before impinging on a respective optical switching element of the array of optical switching elements and travels a common distance through the array of optical switching elements from the at least one first set of ports to the at least one second set of ports as the optical byte of data is directed in parallel as a unit from the at least one first set of ports to the at least one second set of ports.

2. The method of claim 1, wherein the array of optical switching elements comprises an array of micro-electro mechanical system (MEMS) devices, each MEMS device having a position controllable reflective surface, and wherein the employing comprises controlling positioning of the reflective surfaces of the MEMS devices in order to transfer in parallel the optical byte of data from the first set of ports to the second set of ports.

3. The method of claim 2, further comprising employing at least one wavelength of the optical byte of data in transferring the optical byte of data in parallel from the first set of ports to the second set of ports using optical filtering and the array of optical switching elements.

* * * * *